United States Patent [19]

Belanger et al.

[11] Patent Number: 5,048,147
[45] Date of Patent: Sep. 17, 1991

[54] SIDE NOZZLE TRACER SYSTEM

[75] Inventors: James A. Belanger; Robert J. Wentworth, both of Northville; Graham J. Astley, Novi, all of Mich.

[73] Assignee: Belanger, Inc., Northville, Mich.

[21] Appl. No.: 605,810

[22] Filed: Oct. 30, 1990

Related U.S. Application Data

[62] Division of Ser. No. 385,031, Jul. 26, 1989, Pat. No. 4,977,689.

[51] Int. Cl.$^5$ .............................................. A47L 5/00
[52] U.S. Cl. .................................. 15/319; 34/243 C; 15/DIG. 2; 15/405
[58] Field of Search .................... 34/243 C, 216; 15/DIG. 2, 405, 319

[56] References Cited

U.S. PATENT DOCUMENTS

| | | | |
|---|---|---|---|
| 2,949,678 | 8/1960 | Anderson | 15/405 |
| 3,224,108 | 12/1965 | Flaming | 34/216 |
| 3,442,027 | 5/1969 | Hurwitz | 15/405 |
| 3,456,275 | 7/1969 | Solomon | 15/319 |
| 3,806,985 | 4/1974 | Takeuchi | 15/307 |
| 4,559,721 | 12/1985 | Hanna | 34/243 C |
| 4,587,688 | 5/1986 | Gougoulas | 15/405 |
| 4,651,442 | 3/1987 | McIntyre | 34/243 C |
| 4,817,301 | 4/1989 | Belanger | 34/243 C |
| 4,836,467 | 6/1989 | Rodgers | 15/319 |
| 4,949,423 | 8/1990 | Larson et al. | 15/319 |

Primary Examiner—Henry A. Bennett
Assistant Examiner—Denise L. F. Gromada
Attorney, Agent, or Firm—Dykema Gossett

[57] ABSTRACT

An apparatus and method are disclosed that aid an accessory of an automobile wash system in being positioned accurately with respect to a particular automobile's width. The system consists of an abutment that is positioned within the path of the conveyed automobile and which will be pivoted out of the path by contact with the automobile. The extent of the pivoting of the abutment from the path of the automobile will give an indication of the width of the automobile. A hydraulic circuit communicates this information to a hydraulic cylinder that controls the positioning of the accessory and can position the accessory to account for the width of the individual automobile. An electronic sensor system is positioned downstream of the accessory and will sense when the automobile has left the automobile wash assembly, at which time the sensor will initiate a signal that returns the members to their original position.

13 Claims, 3 Drawing Sheets

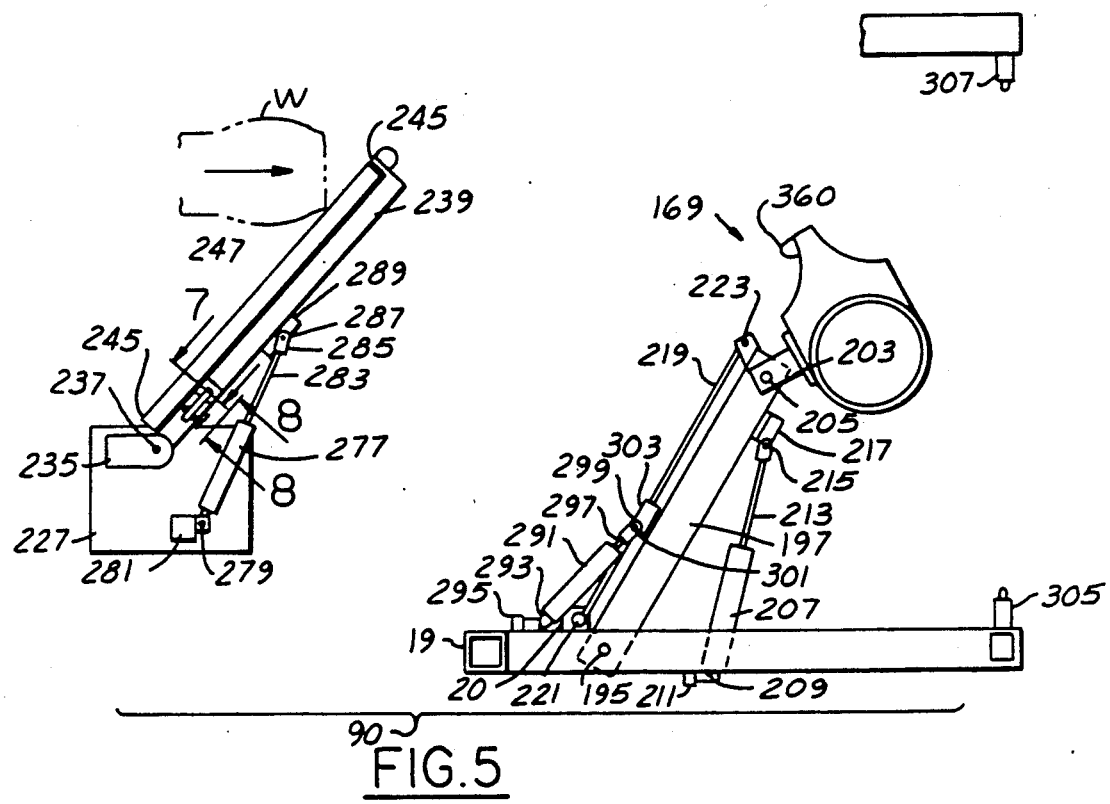
FIG.5
FIG.6
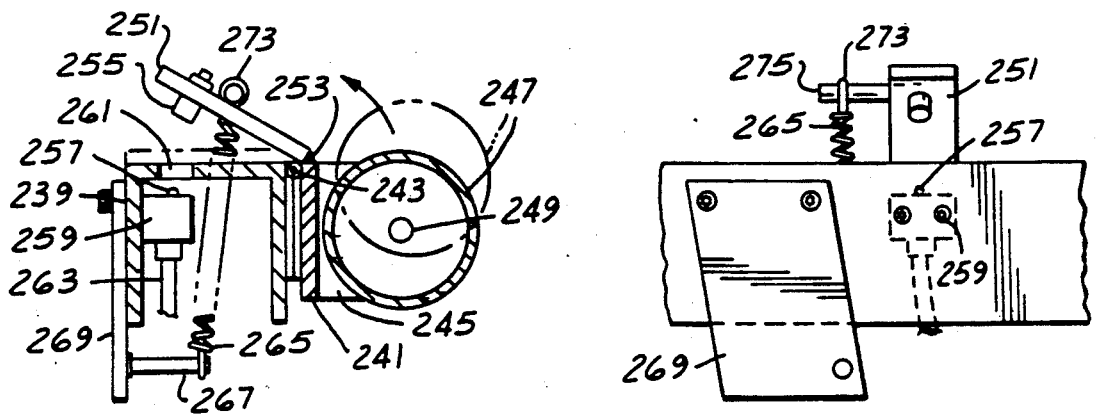
FIG.7
FIG.8

SIDE NOZZLE TRACER SYSTEM

This is a division of parent case Ser. No. 07/385,031 now U.S. Pat. No. 4,977,689.

BACKGROUND OF THE INVENTION

This invention in general relates to a device for giving an indication of the entry of an automobile into a particular section of an automobile wash system. In particular, this invention discloses a hydraulic system that communicates the entry of an automobile into a particular section of a automobile wash system and accurately gives an indication of the width of the automobile to accessories in the automobile wash system.

Modern automobile wash system consist of a variety of accessories including any water applicators, brushes, and drying nozzles among others. It is important in many applications that these accessories be accurately positioned with regard to the width of the automobile; however, due to variety among the widths of automobiles it is impossible to fix an accessory at a position where it will be uniformly close to the side of every type of automobile.

In addition, modern automobile wash systems have some indication system for indicating when an automobile has entered and left a particular section of the automobile wash system. In general, these indication systems consist of some electronic type of device.

It is an object of the present invention to disclose a hydraulic control system that will give an accessory an indication of the width of a particular automobile thus allowing the accessory to be positioned accurately with respect to the particular automobile that has entered the automobile wash system.

It is further an object of the present invention to disclose a system that will transmit a mechanical signal from the automobile to the accessories in the car wash system of the fact that an automobile has entered a particular section of the wash system.

Moreover, it is an object of the present invention to achieve the above-stated goals with a system that works reliably, is inexpensive, and has relatively few moving parts.

SUMMARY OF THE INVENTION

The present invention discloses a vehicle tracer system that consists of a first tracer switch member that is positioned in the path of an automobile that is being conveyed along an automobile wash system. The automobile that is conveyed will contact the first tracer member and pivot it out of the way of the automobile. The extent that the first tracer member has been pivoted away from the automobile will give an indication of the width of the automobile. A hydraulic control system transmits this pivoting extent to a positioning system for a second tracer member that mounts an accessory. It is envisioned that this tracer system could be utilized for any type of automobile wash accessory, in particular, it is envisioned for use with a side blower nozzle housing.

A preferred embodiment of the hydraulic circuit utilized by the disclosed invention consists of a one-to-one transfer between two hydraulic cylinders that gives a direct indication of the amount that the first tracer member has been moved to the hydraulic cylinder of the second tracer member. That is, if the first tracer member is displaced by a distance of one foot, the hydraulic system will move the accessory one foot, such that it is tailored for an automobile having the given width indicated by the first tracer member.

Various types of hydraulic circuitry are disclosed to achieve the above-stated goals.

In addition, control systems for controlling the various hydraulic circuits are disclosed.

BRIEF DESCRIPTION OF THE DRAWINGS

FIG. 5 is a top view showing in detail the mechanical movement that actuates the first and second tracer elements of FIG. 3.

FIG. 6 is a view similar to FIG. 5.

FIG. 7 shows a switch associated with the first element of the tracer system of FIG. 3.

FIG. 8 is a view of the switch of FIG. 7 rotated 90 degrees.

DETAILED DESCRIPTION OF THE PREFERRED EMBODIMENT

Figure 1:
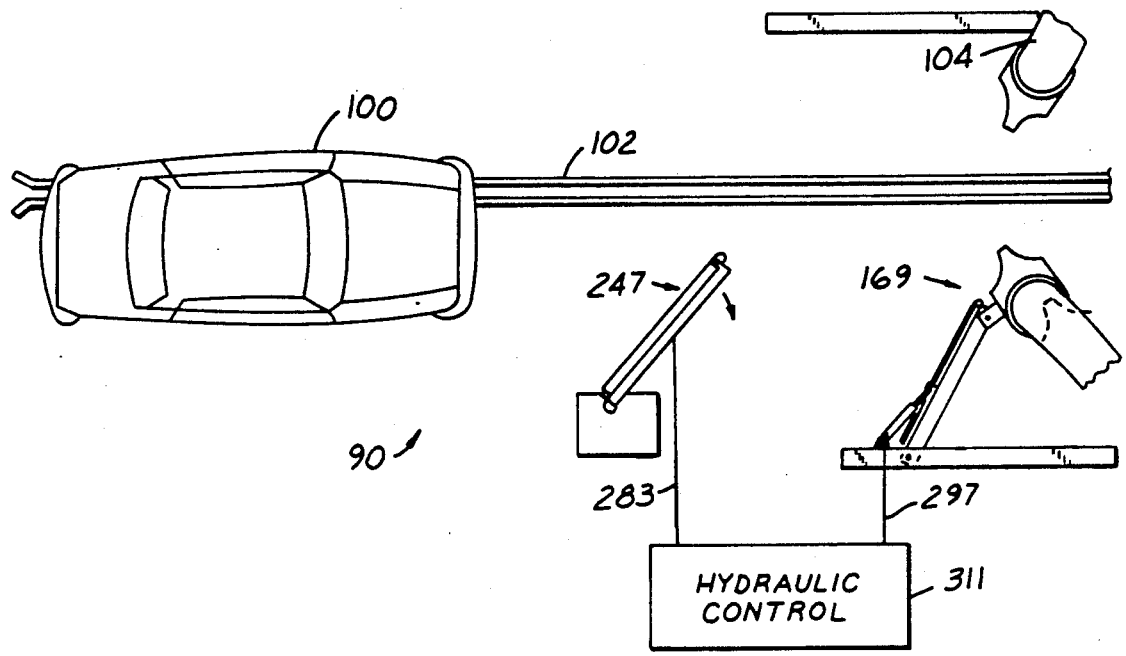
FIG. 1 is a top view showing an automobile being conveyed into an automobile wash system having the tracer system of the present invention.

As shown in FIG. 1, an automobile wash system 90 having a novel tracer system built therein consists of a track 102 for guiding a conveyed automobile 100 through the wash system. As shown in FIG. 1, nozzles 104 and 169 are positioned on both lateral sides of the automobile. Nozzle 104 is fixed at a particular lateral position and nozzle 169 may be adjusted to conform to the width of the particular automobile. As illustrated, the automobile 100 will contact a push bar 247 that will pivot in a direction away from the automobile, give an indication of the fact that the automobile is entering the system and will also give an indication of the width of the particular automobile. The indication from the push rod 247 will be transmitted to a hydraulic control 311 that will in turn accurately position nozzle 169 with respect to the width of the particular automobile.

Figure 2:
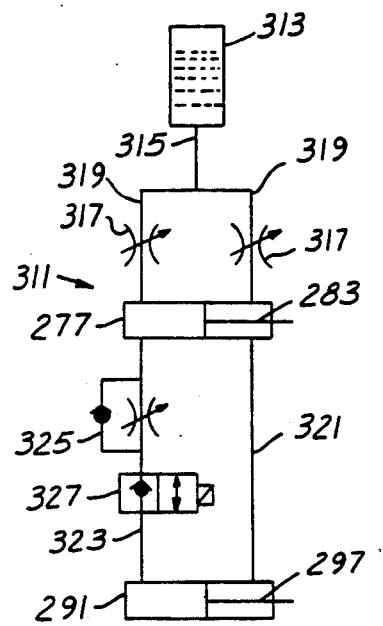
FIG. 2 is a schematic view showing a preferred embodiment of a hydraulic control system utilized by the present invention.

A preferred embodiment of the hydraulic circuit 311 is disclosed in FIG. 2. Hydraulic circuit 311 includes a cylinder 277 associated with push bar 247 through rod 283. Hydraulic circuit 311 further comprises a second cylinder 291 associated with nozzle 169 through rod 297. An oil reservoir 313 having an outlet conduit 315 supplies the system with hydraulic fluid. Normally closed needle valves 317 are used for feeding oil from reservoir 313 into respective ends of cylinders 277 and 291 through branch lines 315, 319. Once the proper amount of hydraulic fluid has been fed into the respective ends of cylinders 277 and 291, the needle valves 317 remain closed so that there is a closed circuit between tracer cylinder 277 and tracer cylinder 291.

Tracer cylinders 277 and 291 have first and second ports at their opposite ends that are respectively connected together in a closed circuit by conduits 321 and 323. Interposed within conduit 323 is an adjustable flow control valve 325 and a spring-biased, normally closed, solenoid-operated, two-position control valve 327.

Valve 327 is normally in the illustrated position allowing flow from cylinder 277 to cylinder 291, but blocking flow in the reverse direction. A first solenoid 329 controls movement of the valve to a second position which will permit the return flow of hydraulic fluid from cylinder 291 to cylinder 277.

Figure 3:
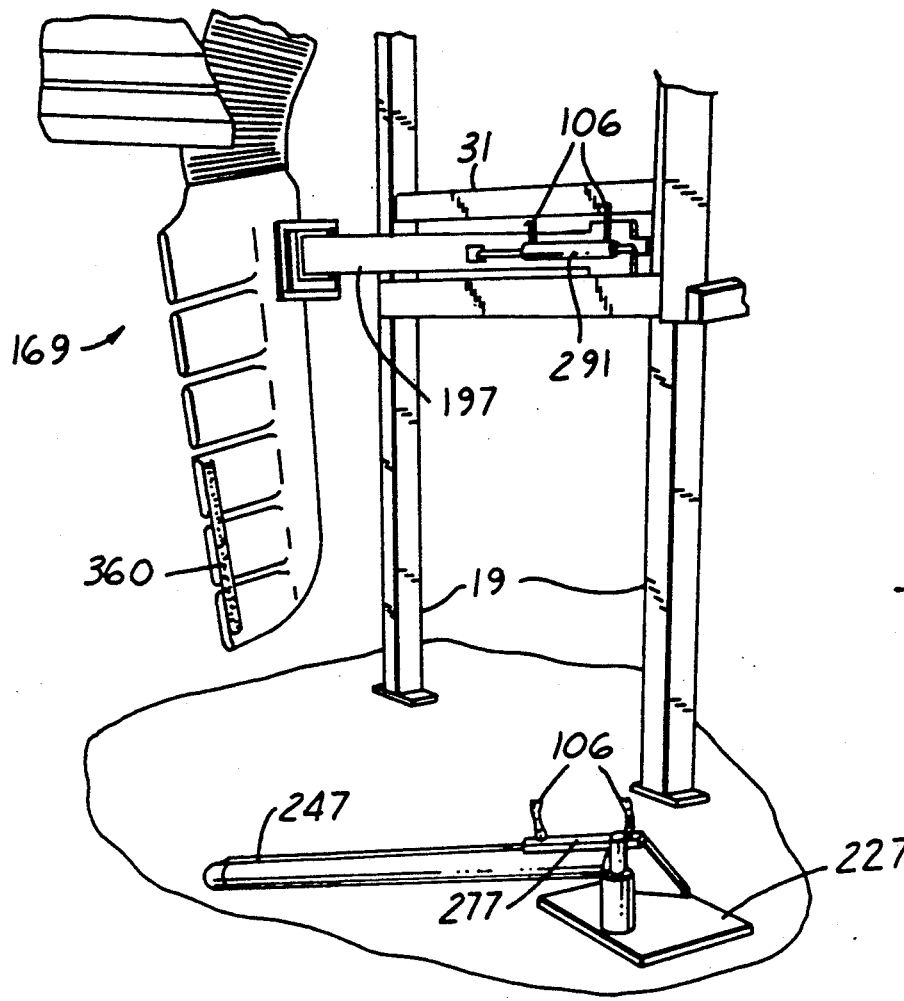
FIG. 3 is a perspective view of the first and second tracer elements of a preferred embodiment of the present invention.

As shown in FIG. 3, the tracer system consists of push bar 247 and nozzle 169. Push bar 247 is mounted on base 227 and has hydraulic connections 106 extending from both sides of cylinder 277.

Nozzle 169 is mounted upon frame 19 and consists of a pivoted nozzle support arm 197. Cylinder 291 pivotally drives support arm 197. As can also be seen, there is a cross support 31 on frame 19 and hydraulic lines 106 leading from cylinder 291. A bump strip 360, which may simply be an air valve, is mounted at an outer surface of nozzle 169 and performs a safety function to be described later.

Figure 4:
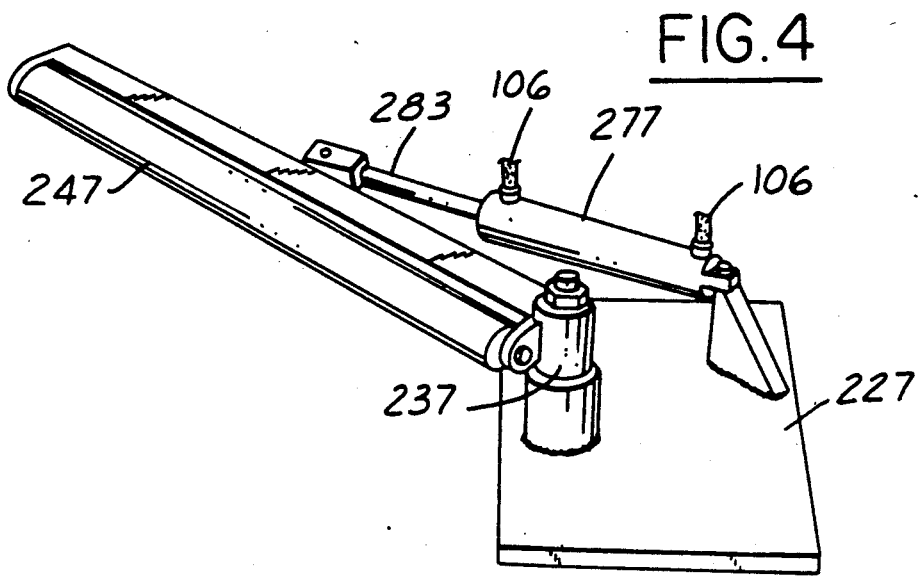
FIG. 4 shows a perspective view of the first tracer element of a preferred embodiment of the present invention.

FIG. 4 shows a close-up view of the push bar 247. Cylinder 277 is mounted to a rear position of bar 247 and consists of rod 283. Bar 247 pivots about point 237 with respect to base 227.

As is shown in FIGS. 5 and 6, nozzle 169 has a multi-bar mounting system. The mounting system of nozzle 169 consists of an air cylinder 207 pivotally mounted at 209 upon a bracket 211 secured on frame 19. Air cylinder 207 includes a reciprocating piston rod 213 which is pivotally connected at 215 to bracket 217 mounted on the end of support arm 197 remote from frame 19.

Arm 197, nozzle 169 and clevis 203 are pivotally mounted at 205. Arm 197 is also pivotally mounted to frame 19 at 195.

An elongate tie bar 219 is generally parallel to support arm 197 and is pivotally mounted at 221 to bracket 20 on frame 19. The opposite end of tie bar 219 is pivotally connected at 223 to clevis 203. Due to the connection of members 197, 203, 219 and 169, the side nozzle 169 is maintained at a preset angle with respect to the automobile, regardless of any pivotal movement of arm 197. This can be seen by comparing FIGS. 5 and 6.

Mounting plate 227 is mounted to the ground and a bracket 235 is fixed to the plate 227. An elongated arm channel 239 is pivotally connected to bracket 235. Push bar 247 normally extends into the path of forward movement of the vehicle. The right front tire W is illustrated in FIG. 5 contacting the bar 247.

First tracer cylinder 277 is pivotally connected at 279 to bracket 281 which is secured to plate 227. Push rod 283 extends from tracer cylinder 277 and has a bracket 285 which is pivotally connected at 287 to anchor plate 289 upon swing arm channel 239.

Second tracer cylinder 291 is pivotally connected at 293 to bracket 295 upon frame 19. Second tracer cylinder 291 includes piston rod 297 shown retracted in FIG. 5 and extended in FIG. 6. Piston rod 297 is mounted at one end to a bracket 299 which is pivotally connected at 301 to anchor plate 303 upon tie bar 219 at an intermediate position thereof.

Downstream of the nozzles 169 and 104 is photo eye receiver 305 which is mounted upon an exit portion of frame 19. An opposed spaced photo eye emitter 307 is mounted upon the opposite side of frame 19 for establishing an electronic beam therebetween. This beam will be interrupted during movement of the vehicle as it passes between the receiver 305 and emitter 307. The beam will be reestablished once the vehicle has passed the receiver and emitter.

An elongated push bar base plate 241 is illustrated in FIGS. 7 and 8 and extends along the outside of channel 239 along its upper edge. It is pivotally connected thereto by a pair of hinges 243, one of which is shown. Arranged upon opposite ends of push bar base plate 241 are a pair of out-turned end supports 245 within which is positioned push bar rod 247 supported and journaled at 249.

An inclined switch plate 251, arranged at an angle with respect to base plate 241, is welded at 253. Metal plug 255 depends from an outer portion of switch plate 251 and is adapted to pivot towards and actuate sensor 257 upon a non-contact proximity switch 259 which is supported within member 239. The switch 259 is preferably of the type that senses the proximity of metal, such as plug 255. Alternatively, a mechanical switch may be used. The top wall of member 239 is apertured at 261 and is adapted to receive plug 255 when switch plate 251 has been rotatably tilted in a counter clockwise direction from the position shown in FIG. 7. Suitable lead wires 263 connect proximity switch 259 into an electric control circuit.

Coil spring 265 is secured at one end to interior anchor post 267 which projects from the lower end of anchor plate 269. The anchor plate 269 is secured to the side wall portion of channel 239. The upper looped end 273 of coil spring 265 extends around rod 275 which overlies switch plate 251 and is suitably secured thereto. Spring 265 normally biases switch plate 251 and metal plug 255 towards sensor 257 on proximity switch 259 thus normally maintaining switch 259 closed.

Spring 265 also would normally maintain push bar 247 in the dash-lined position shown until contact with a vehicle occurs as is illustrated in FIG. 5. Upon contact with a vehicle, the bar 247 is forced against the spring bias 265 to the solid line position in FIG. 7. This also moves plate 251 and plug 255 to the position illustrated in FIG. 7.

Figure 9:
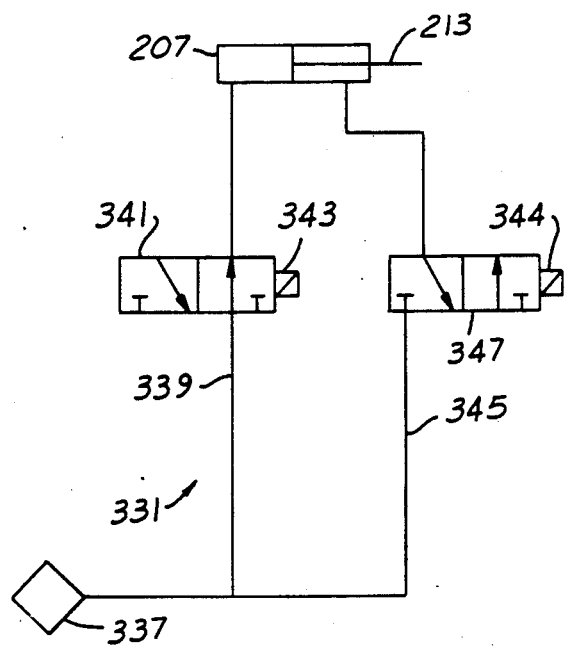
FIG. 9 is an additional control circuit for use with the hydraulic circuit illustrated in FIG. 2.

Referring to FIG. 9, a pneumatic circuit 331 includes a pressurized air source 337. Air line 339 delivers pressurized air to a solenoid-operated, two-position, spring-biased valve 341 which connects to one end of air cylinder 207. Valve 341 is under the control of solenoid 343, which is normally energized and maintained in the illustrated position so that pressurized air is directed to the air cylinder 207 moving the piston rod 213 outwardly and normally biasing pivot arm 197 inwardly with respect to frame 19. This results in a corresponding inward positioning, in the direction of a vehicle, of side air nozzle 169. Rod 213 is thus normally maintained extended, positioning nozzle 169 as shown in FIG. 5.

Branch air line 345 from pressurized air source 337 is connected to a solenoid operated, two-position, spring-biased valve 347. Valve 347 is under the control of solenoid 344. Solenoid 344 maintains valve 347 in the illustrated position to allow that end of cylinder 207 to bleed to atmosphere.

Solenoid 344 controls a valve 347 and is normally maintained de-energized, as in its illustrated position. When the bump strip 360 is activated all signals to solenoid 343 are broken. Thus valve 341 returns to its non-illustrated position and the air in cylinder 207 is dumped. At the same time, solenoid 344 is energized allowing pressurized air to be directed to the front side of piston rod 213 to aid in moving the piston rod inwardly away from the path of the vehicle. By this arrangement, bump strip 360 is actuated as a safety shut-off if the automobile somehow contacts the air nozzle 169. This is of course undesirable and the arrangement of bump strip 360, solenoid 344 and valve 347 will ensure that the nozzle 169 will be withdrawn immediately from the path of the automobile should the nozzle be improperly positioned too far within the path of the automobile.

When the automobile contacts bar 247, it is pivoted downwardly to the position shown in solid lines in FIG. 6. This biases plate 241 in a clockwise direction and removes plug 255 away from sensor 257 thus actuating switch 259. A signal is sent through line 263 to solenoid 343, and it is de-energized and moved to its second position, that is, the position that is not illustrated in FIG. 9.

While this is happening, the pivoting of push bar 247 in a clockwise direction that has been caused by the contact with the wheel will also drive rod 283 into first tracer cylinder 277. This causes flow through valve 325, valve 327, line 323 and into cylinder 291. The flow into cylinder 291 causes rod 297 to be forced outwardly of cylinder 291. When bar 297 moves outwardly from cylinder 291, it also aids in driving bar 197 counterclockwise. As rod 297 moves outwardly, it displaces fluid from the front end of cylinder 291 through line 321 back into cylinder 277. Once the wheel has pivoted bar 247 to a great enough extent to allow the automobile to pass therethrough, the rod 283 will no longer be driven into cylinder 277. At this point, the transfer of fluid from cylinder 277 to cylinder 291 will stop. Thus, the movement of rod 297 will also stop, and the nozzle 169 will be accurately positioned with respect to the individual automobile's width.

The vehicle will now pass through the system. The nozzle 169, or other accessory, will act on the vehicle, and the vehicle will exit the system. The vehicle breaks the beam between members 305, 307 when it exits.

Once the beam between members 305 and 307 has been re-established, a timer is energized. The timer immediately unlocks valve 327 thus allowing nozzle 169 to return to its original position. The timer maintains the valve 327 unlocked for a sufficient amount of time that the nozzle 169 can be assured of returning to its normal position before the entry of the next automobile. It is to be understood that this movement of valve 327 pivots arm 197 counterclockwise and will force rod 297 back into cylinder 291. As rod 297 moves into cylinder 291, it will displace the fluid through valves 329 and 325 back into cylinder 277.

Other signals can be utilized other than the beam between the member 305 and 307. Floor mounted limit switches or some sort of car wash programmer channel control are also visualized to initiate the return of the various members to their initial states.

In this embodiment, the point at which the cylinders 277, 291 are mounted to members 239, 219, and the respective sizes of the cylinders, controls the ratios of relative movement between the bar 247 and nozzle 169. Preferably, the ratio is maintained at 1:1. A worker in the art would know how to accomplish this, for example, by having the cylinders 277, 291 be of the same diameter and length, mounting each to the center of members 239, 219 and having members 239, 219 be of the same length.

A preferred embodiment of the invention has been disclosed. However, a worker in the art would realize that certain modifications would be obvious to one skilled in the art. Having now described my invention, reference should now be had to the following claims.

We claim:

1. A method of accurately positioning an accessory within a vehicle wash system to reflect the width of a particular vehicle, including the steps of:
   (A) disposing an abutment within the path of the conveyed vehicle;
   (B) determining the exact width of the vehicle and communicating signals with regard to the width from the abutment to a control for positioning the accessory, such that the communicating gives an exact indication to the accessory of the width of the conveyed vehicle, and moving the accessory to one of several positions in response to the width signal.

2. A method as recited in claim 1, and further wherein said means of communicating include an hydraulic circuit.

3. A method as recited in claim 1, and further wherein a signal is initiated upon contact by the conveyed vehicle with the abutment to aid in movement of the accessory.

4. A method as recited in claim 1, and further wherein there being two cylinders moving the accessory.

5. A method as recited in claim 4, and further wherein a sensor senses the exit of the conveyed vehicle from the system and sends a signal to a timer which will return the abutment and the accessory to their original positions.

6. A method as recited in claim 5, and further wherein the signal actuates a valve.

7. A method as recited in claim 6, and further wherein the accessory is a blower nozzle.

8. A method as recited in claim 1, wherein there are an infinite number of positions that said accessory may be moved to.

9. A method as recited in claim 1, wherein the accessory moves an amount proportional to the exact determined width of the vehicle.

10. A method of accurately positioning an accessory within a vehicle wash system to reflect the actual width of a particular vehicle, including the steps of:
    (A) positioning an automatic means for determining the exact width of a vehicle in a position such that it can determine the width of a particular vehicle;
    (B) determining the exact width of a particular vehicle;
    (C) communicating a signal being a reflection of the exact width to a means for positioning the accessory; and
    (D) moving the accessory to one of a plurality of positions depending on the exact width of the vehicle.

11. A method as recited in claim 10, wherein there are an infinite number of positions that the accessory may be moved to.

12. A method as recited in claim 10, wherein the automatic means is an abutment placed in the vehicle path in order to determine the exact width of the vehicle.

13. A method as recited in claim 10, wherein the accessory moves an amount proportional to the exact determined width of the vehicle.

* * * * *